March 12, 1946.  E. GRAF  2,396,323

STORAGE BATTERY CONTAINER

Filed Jan. 13, 1943

INVENTOR

Ernest Graf

BY

Augustus B. Stoughton

ATTORNEY.

WITNESS:

Robt. R. Kitchel.

Patented Mar. 12, 1946

2,396,323

UNITED STATES PATENT OFFICE 2,396,323

STORAGE BATTERY CONTAINER

Ernest Graf, Philadelphia, Pa., assignor to The Electric Storage Battery Co., a corporation of New Jersey Application January 13, 1943, Serial No. 472,193

7 Claims. (Cl. 136—170)

This invention relates to the construction of storage battery cells and is directed to improved means for preventing upward displacement of the cover of such a cell relatively to the container walls. As usually designed, the cover of a storage battery cell fits quite snugly into the upper opening of the container walls, and is provided with peripheral depending and outwardly sloping walls terminating below in a horizontally projecting flange which abuts against the inner surface of the container walls, thus providing a channel for sealing compound. The cover is usually secured to the projecting terminal posts of the plate groups within the cell which in turn may rest on upstanding ribs in the bottom of the container or may be suspended from the cover, in which latter case the cover may be supported on a shoulder on the inner wall of the container.

In either case, downward displacement of the cover with respect to the container is prevented, in the one case by resting on the plate groups which in turn are supported on the bottom ribs, and in the other case by direct support on the shoulder of the container wall. There is, however, ordinarily nothing to oppose the upward displacement of the cover except the weight of the assembled parts and the sealing compound which in case of severe vertical vibration, such as occurs in street and industrial electric truck service and often in vehicles driven by internal combustion engines, or in case of complete inversion of the battery, is frequently inadequate, resulting in relative motion between cover and container thus breaking the seal and permitting the escape of acid electrolyte with the usual undesirable results.

An object of this invention is to provide simple, inexpensive and highly effective means for holding down the cover of a battery cell in respect to the cell container.

Another object is to provide such hold-down means which can be easily and simply applied after the cover has been assembled in the container without the use of special tools.

Another object is to provide such hold-down means which may be incorporated in present standard designs without any change in overall dimensions and may be employed without introducing costly changes in existing designs of covers and containers.

Another object is to provide such hold-down means which will be held in place, after assembly, by its own resiliency.

Another object is to provide such hold-down means which may be assembled in the channel usually provided between the cover and the container walls for the reception of sealing compound and which, after such assembly, may be completely covered and protected by the sealing compound.

Another object is to provide such hold-down means which may be assembled in the sealing channel of the standard storage battery cell without interfering with the application or effectiveness of the sealing compound.

Other objects of this invention will appear as the following detailed description proceeds and the features of novelty which characterize this invention will be set forth in the claims appended to and forming a part of this specification.

For a more complete understanding of this invention reference should be had to the accompanying drawing in which.

Figure 1:
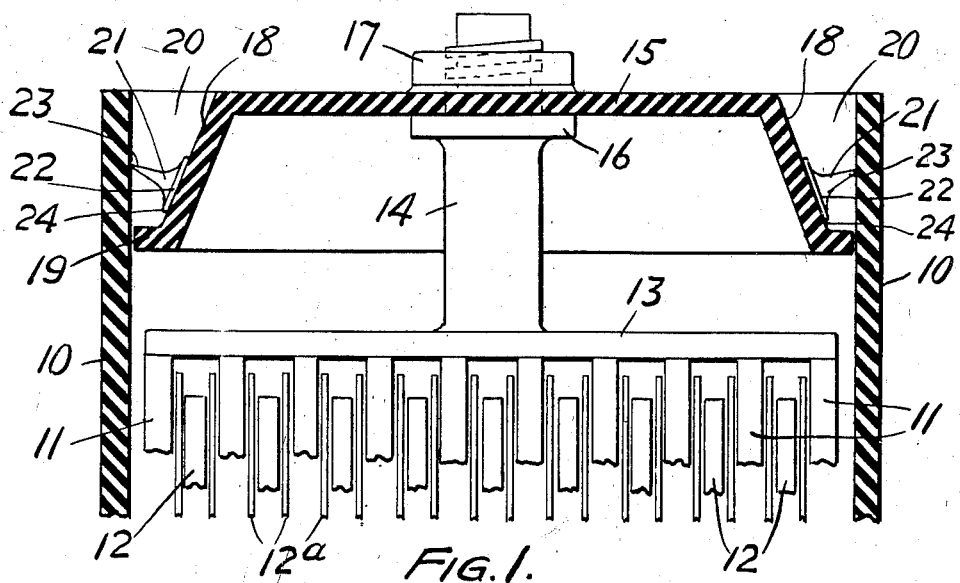
Figure 1 illustrates in elevation, partly in section, one embodiment of the invention in which the hold-down means are in the form of tack-like members located in the sealing channel and engaging the confronting walls of the cover and the container, and solicited into penetrating relation in the inner face of the container by gravity.

Referring to Figure 1, the numeral 10 denotes the walls of the container of a storage battery cell, which may be of any suitable material such as hard rubber. Within the container are the usual groups of negative and positive plates indicated respectively at 11 and 12, separated by the usual separators 12a. The plates are connected to the usual straps of which the negative strap is shown at 13, with its upstanding terminal post 14. The cell cover is shown at 15, supported on the shoulder 16 of the post 14, to which it is clamped by the nut 17 in the usual manner.

The cover 15 is provided with outwardly inclined or sloping depending peripheral walls 18 terminating below in an outwardly projecting flange 19 which fits snugly against the inner surface of the container walls 10, thus providing a channel 20 for sealing compound (not shown).

The plate groups are supported in the usual manner on upstanding ribs on the bottom of the container (not shown). The construction thus far described is in accordance with present standard design.

In the sealing channel 20 are located cover hold-down members 21, here shown as tack-like bodies with enlarged flat heads 22 resting against the sloping cover walls 18 and with their pointed ends 23 engaging the inner surface of the container walls 10. These hold-down members are located as shown, after the cover is assembled in the container and bolted to the terminal posts, by sliding them down along the sloping walls of the cover until the points engage the container walls 10, as shown. It will be seen that the hold-down members 21, by reason of the sloping angle of the walls 18, frictionally engage and bear against those walls at a lower level than that at which the pointed ends 23 engage the walls 10, so that any tendency for upward displacement of the cover relatively to the container will cause the hold-downs to turn about the points 23 at one end and about the lowest points 24 of the heads at the other end, producing a toggle-like effect which will imbed the points 23 more deeply into the walls 10 and oppose any further upward displacement of the cover.

Figures 2, 3:
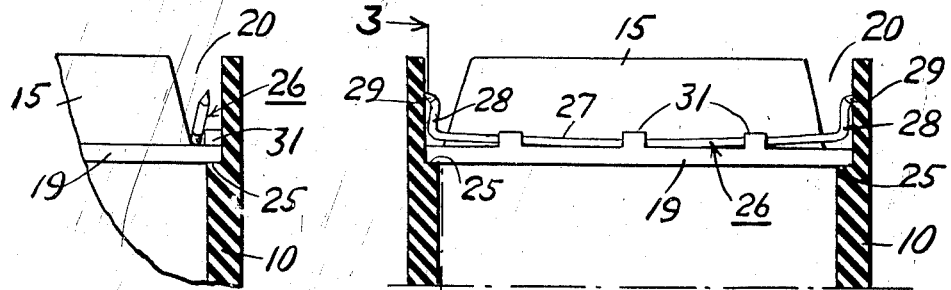
Figure 2 shows, in elevation, partly in section, a modification in which a resilient hold-down member lies horizontally in the sealing groove with its upstanding pointed ends solicited into engagement with the container walls by spring resilience.
Figure 3 is an elevation, partly in section, on the line 3—3 of Figure 2.
Figure 4:
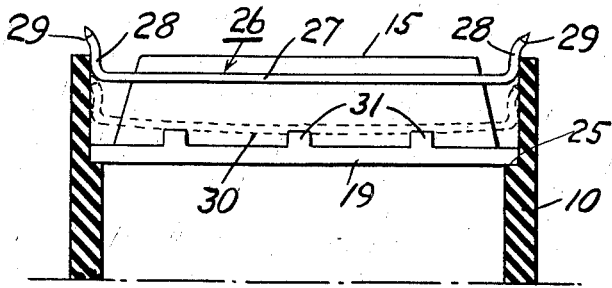
Figure 4 is a view similar to Figure 2 in which the hold-down member is shown in two consecutive positions during assembly.

In Figures 2 through 4 is shown a modified form of cover hold-down employed, preferably, at each end of the cover. The cover is supported on the internal shoulders 25 of the container walls 10 and the hold-down comprises a resilient member 26 which may be of steel wire or similar material, having a horizontal portion 27 and upturned ends 28 terminating in outwardly projecting, sharpened points 29. In the final assembly, as shown in Figures 2 and 3, this cover hold-down is positioned in the sealing groove 20 with its longitudinal horizontal portion resting on the cover flange 19 slightly downwardly bent and with its upturned ends confronting the container walls and its points 29 imbedded in said walls thus soliciting the points into engagement with the container wall by spring action or resilience. When unconstrained the overall length of this hold-down member is slightly greater than the distance between the container walls with which it engages, as shown in Figure 4. When this hold-down member is pressed down during assembly the horizontal portion is bowed downwardly, as shown in dotted lines at 30 in Figure 4, causing the pointed ends 29 to press against the inner surface of the container walls until the hold-down member assumes its final location as shown in Figures 2 and 3. It will be seen that any tendency for upward displacement of the cover will cause the pointed ends 29 to be more firmly imbedded in the container walls to oppose such displacement by reason of the resiliency of member 26 tending to restore its original length as shown in Figure 4.

The hold-down member 26, as shown in Figures 2 and 3, may be held in place by the stops or bosses 31 molded as upstanding projections from the horizontal flange 19 of the cover. These stops are for the purpose of insuring that the horizontal portion of the hold-down member 26 will be positioned at the inside corner of the cover and hence remote from any acid fumes seeping through the joint between the outside edge of the cover and the adjacent side walls of the jar. By thus positioning the hold-down it will be completely imbedded in the sealing compound and protected from acid attack. If care is used in the assembly of the hold-down to see that it is positioned as shown and just described, the stops or bosses 31 may be omitted. If employed these bosses can be added by a simple and inexpensive modification of the cover mold and with practically no increase in the unit cost of the covers.

From the foregoing detailed description it will be observed that there is provided in accordance with this invention relatively simple and inexpensive means for accomplishing the objects set forth above and it is to be particularly observed that neither of the modifications shown and described will cause any change in the overall dimensions of the cell; nor will the presence of the herein described hold-down members in the sealing channel interfere with the introduction of the sealing compound or its effectiveness in providing and maintaining the seal between the cover and the container walls.

While there has been illustrated and described particular embodiments of this invention, other modifications may occur to those skilled in the art; and it is intended in the appended claims to cover all such modifications as fall within the true spirit and scope of this invention.

I claim:

1. In a storage battery cell comprising an open top container having imperforate walls and a cover fitted within its upper walls, said cover having downwardly extending peripheral wall confronting and spaced from said container walls to provide a channel for sealing compound, the combination with said cover and container walls of a plurality of cover hold-down elements disposed at spaced intervals in said channel, said hold-down elements provided with upwardly extending rigid sharp projections held by said cover walls in engagement with said container walls at distributed points whereby upward displacement of the cover relative to the container is opposed without impairing the effectiveness of the sealing compound.

2. A storage battery cell having an open top container and its cover, said cover having downwardly extending peripheral walls confronting and spaced from said container walls to provide a channel for sealing compound, and provided between the cover and the inner face of the wall of the container with a cover hold-down device equipped with a pointed end and means in engagement with the cover at a point below the level of the pointed end normally soliciting the pointed end into engagement with the inner face of the wall of the container.

3. In a storage battery cell comprising an open top container having a cover fitted within its upper walls, said cover having downwardly extending peripheral walls confronting and spaced from said container walls, the combination with said cover and container walls of a cover hold-down element frictionally engaging said cover and container walls at relatively lower and higher points respectively, said element being sharpened at the point of contact with one of said walls whereby any tendency to upward displacement of the cover relatively to the container will cause said sharpened point to be imbedded into said wall to resist such displacement.

4. In a storage battery cell comprising an open top container having a cover fitting within its upper walls, said cover having downwardly extending peripheral walls confronting and spaced from said container walls and terminating below in an outwardly projecting flange, the combination with said cover and container walls of a plurality of cover hold-down elements whereof one portion of each element bears against one of said cover walls and another portion is provided with a point engaging the adjacent container wall at a level above the point of engagement of said first portion and said cover walls.

5. In a storage battery cell comprising an open top container having a cover fitting within its upper walls, said cover having downwardly extending peripheral walls confronting and spaced from said container walls and terminating below in an outwardly projecting flange the combination with said cover and container walls of cover hold-down elements on opposite sides of said cover each comprising a horizontal portion resting longitudinally on said flange and upturned end portions having outwardly projecting points engaging the container walls at levels above said flange.

6. In a storage battery cell comprising an open top container having a cover fitting within its upper walls, said cover having downwardly extending peripheral walls confronting and spaced from said container walls and terminating below in an outwardly projecting flange, the combination with said cover and container walls of resilient cover hold-down elements comprising horizontal portions resting longitudinally on said flange and upturned end portions having outwardly projecting points engaging opposite container walls at levels above said flange.

7. In a storage battery cell comprising an open top container having a cover fitting within its upper walls, said cover having downwardly extending peripheral walls confronting and spaced from said container walls and terminating below in an outwardly projecting flange, the combination with said cover and container walls of a cover hold-down element comprising a resilient horizontal portion resting longitudinally on said flange and angularly and upwardly disposed and pointed end portions held by the resilience of the longitudinal portion in engagement with the container walls.

ERNEST GRAF.